(12) United States Patent
Espinoza et al.

(10) Patent No.: US 7,230,035 B2
(45) Date of Patent: Jun. 12, 2007

(54) CATALYSTS FOR THE CONVERSION OF METHANE TO SYNTHESIS GAS

(75) Inventors: Rafael L. Espinoza, Ponca City, OK (US); Kandaswamy Jothimurugesan, Ponca City, OK (US); Tianyan Niu, Ponca City, OK (US); Harold A. Wright, Ponca City, OK (US); Shuibo Xie, Ponca City, OK (US); Mary E. Wolf, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 433 days.

(21) Appl. No.: 10/747,718

(22) Filed: Dec. 29, 2003

(65) Prior Publication Data

US 2004/0192792 A1 Sep. 30, 2004

Related U.S. Application Data (60) Provisional application No. 60/437,071, filed on Dec. 30, 2002, provisional application No. 60/437,124, filed on Dec. 30, 2002.

(51) Int. Cl.
*C01B 3/36* (2006.01)
*C01B 3/40* (2006.01)
*C07C 27/06* (2006.01)

(52) U.S. Cl. .................................. 518/703; 252/373
(58) Field of Classification Search ................ 252/373; 518/703
See application file for complete search history.

(56) References Cited

U.S. PATENT DOCUMENTS

| | | | |
|---|---|---|---|
| 3,816,344 A | 6/1974 | Shimizu et al. | |
| 3,931,050 A | 1/1976 | Asano et al. | |
| 4,128,506 A | 12/1978 | Hegedus et al. | |
| 4,233,189 A | 11/1980 | Gandhi et al. | |
| 4,376,724 A | 3/1983 | Mita et al. | |
| 4,420,420 A | 12/1983 | Mita et al. | |
| 4,519,951 A | 5/1985 | Qualeatti et al. | |

(Continued)

FOREIGN PATENT DOCUMENTS

| | | |
|---|---|---|
| EP | 0303438 | 2/1989 |
| EP | 0333037 | 9/1989 |
| EP | 0 558 343 A1 | 1/1993 |
| EP | 0640561 | 3/1995 |
| EP | 0974551 | 1/2000 |
| GB | 1 283 737 A | 8/1972 |
| GB | 2 310 384 A | 8/1997 |
| WO | WO93/01130 | 1/1993 |
| WO | WO96/16737 | 6/1996 |
| WO | WO 99/37580 | 7/1999 |
| WO | WO99/48805 | 9/1999 |
| WO | WO01/00595 | 4/2001 |

OTHER PUBLICATIONS

Geankoplis, Christie J.; *Transport Processes and Unit Operations*; p. 837; 1983, no month.

(Continued)

*Primary Examiner*—Wayne A. Langel
(74) *Attorney, Agent, or Firm*—Conley Rose P.C.

(57) ABSTRACT

The present invention relates to improved catalyst compositions, as well as methods of making and using such compositions to prepare synthesis gas and ultimately $C_{5+}$ hydrocarbons. In particular, preferred embodiments of the present invention comprise catalyst systems comprising a core and an outer region disposed on said core, wherein a substantial amount of the catalytic metal is located in the outer region of the catalyst support matrix. In addition, the catalyst systems are able to maintain high conversion and selectivity values with very low catalytically active metal loadings. The catalyst systems are appropriate for improved syngas, oxidative dehydrogenation and other partial oxidation reactions, including improved reaction schemes for the conversion of hydrocarbon gas to $C_{5+}$ hydrocarbons.

40 Claims, 4 Drawing Sheets

U.S. PATENT DOCUMENTS

| | | | |
|---|---|---|---|
| 4,601,859 A | 7/1986 | Galle et al. | 558/459 |
| 4,835,131 A | 5/1989 | DeJong | |
| 5,012,027 A | 4/1991 | Abrevaya et al. | |
| 5,023,276 A | 6/1991 | Yarrington | 514/703 |
| 5,036,032 A | 7/1991 | Iglesia et al. | |
| 5,039,643 A | 8/1991 | Hecht et al. | |
| 5,149,464 A | 9/1992 | Green | 252/373 |
| 5,252,613 A | 10/1993 | Chang et al. | 518/700 |
| 5,348,982 A | 9/1994 | Herbolzheimer et al. | 518/700 |
| 5,352,645 A | 10/1994 | Schwartz | |
| 5,382,748 A | 1/1995 | Behrmann et al. | 585/899 |
| 5,395,406 A * | 3/1995 | Clavenna et al. | 48/198.7 |
| 5,431,855 A | 7/1995 | Green | 252/373 |
| 5,447,705 A | 9/1995 | Petit | 423/418.2 |
| 5,500,149 A | 3/1996 | Green | 252/373 |
| 5,510,056 A | 4/1996 | Jacobs | 252/373 |
| 5,597,771 A | 1/1997 | Hu et al. | |
| 5,648,582 A | 7/1997 | Schmidt | 585/652 |
| 5,827,902 A | 10/1998 | Maretto et al. | 518/706 |
| 5,851,948 A | 12/1998 | Chuang et al. | |
| 5,900,386 A | 5/1999 | Freund et al. | |
| 5,961,933 A | 10/1999 | Casanave et al. | 422/211 |
| 6,060,524 A | 5/2000 | Casanave et al. | 518/706 |
| 6,156,809 A | 12/2000 | Clark et al. | 518/719 |
| 6,169,120 B1 | 1/2001 | Beer | 518/715 |
| 6,281,385 B1 | 8/2001 | Ruedinger et al. | |
| 6,365,544 B2 | 4/2002 | Herron et al. | 502/326 |
| 6,368,997 B2 | 4/2002 | Herron et al. | 502/302 |
| 6,403,660 B1 | 6/2002 | Espinoza et al. | 518/700 |
| 6,911,161 B2 * | 6/2005 | Xu et al. | 252/373 |
| 6,946,114 B2 * | 9/2005 | Allison et al. | 423/651 |
| 2002/0013227 A1 | 1/2002 | Dindi et al. | |
| 2002/0035033 A1 | 3/2002 | Muller et al. | |
| 2002/0115730 A1 | 8/2002 | Allison et al. | |
| 2003/0096881 A1 | 5/2003 | Minkkinen et al | 518/728 |
| 2003/0114543 A1 | 6/2003 | Zhang et al. | |
| 2004/0142815 A1 | 7/2004 | Ramani et al. | |

OTHER PUBLICATIONS

Maximilian Fichtner, et al; *Microstructured Rhodium Catalysts for the Partial Oxidation of Methane to Syngas Under Pressure*; Ind. Eng. Chem. Res. 2001, 40:3475-3483, no month.

A.G. Dietz III and L.D. Schmidt; *Effect of Pressure on Three Catalytic Partial Oxidation Reactions at Millisecond Contact Times*; Catalysis Letters 33 (1995) 15-29, no month.

A.T. Ashcroft, et al; *Selective Oxidation of Methane to Synthesis Gas Using Transition Metal Catalysts*; Letters to Nature, vol. 344, 1990, no month.

Patrick D.F. Vernon, et al.; *Partial Oxidation of Methane to Synthesis Gas*; Catalysis Letters 6 (1990) 181-186, no month.

K.L. Hohn and L.D. Schmidt; *Parial Oxidation of Methane to Syngas at High Space Velocities Over Rh-coated Spheres*; Applied Catalysis A: General 211 (2001) 53-68, no month.

Jacek A. Lapszewicz and Xuan-Zhen Jiang; *Characteristics and Performance of Catalysts for Partial Oxidation of Natural Gas to Syngas*; Symposium on Chemistry and Characterization of Supported Metal Catalysts Presented Before the Division of Petroleum Chemistry, Inc., 206th National Meeting, American Chemical Society, Chicago, II; Aug. 22-27, 1993.

A. Cybulski and Jacob A. Moulijin; *Structured Catalyst and Reactors; Transformation of Structured Carrier into Structured Catalyst*; Chapter 21, pp. 599-615, 1998, no month.

Tsang, S.C. et al, *Recent Advances in the Conversion of Methane to Synthesis Gas*, Catal. Today 23:3-15 (1995), no month.

Yuzaki, Koichi et al., *Catalytic Decomposition of $N_2O$ Over Supported Rhodium Catalysts: High Activities of Rh/USY and Rh/$AL_2O_3$ and the Effect of Rh Precursors*, Catalysis Letters 47 (1997) 173-175, no month.

E. Ruckenstein and H.Y. Wang; *Partial Oxidation of Methane to Synthesis Gas Over MgO-supported Rh Catalysts: the Effect of Precursor of MgO*; Applied Catalysis A: General 198 (2000) 33-41, no month.

(PCT) Results of Partial International Search.

European Search Report, EP 01 97 0632 dated Aug. 14, 2003, 2 pages.

S. Bernal et al., "Influence of the preparation procedure on the chemical and microstructural properties of lanthana promoted Rh/$SiO_2$ catalysts A FTIR spectroscopic study of chemisorbed CO", Journal of Alloys and Compounds 250 (1997) 461-466, no month.

Michael F. Mark et al., "$CO_2$-Reforming of Methane on Supported Rh and Ir Catalysts", Journal of Catalysis 164 (1996) 122-130, no month.

Qian-Gu Yan et al., "Promoting Effect of Rare Earth Oxides On Ni/$Re_xO_y$-$Al_2O_3$ Catalyst for Partial Oxidation of Methane to Synthesis Gas", Journal of Natural Gas Chemistry, vol. 6, No. 2 (1997) 93-100, no month.

V.R. Choudhary et al., "Oxidative Conversion of Methane to Syngas over Nickel Supported on Commercial Low Surface Area Porous Catalyst Carriers Precoated with Alkaline and Rare Earth Oxides", Journal of Catalysis, vol. 172, No. 2 (1997) 281-293, no month.

Article entitled: "*Hydrodynamic characterization of slurry bubble-column reactors for Fischer-Tropsch synthesis*," by N.B. Jackson et al, Advanced Energy Technology Center, Sandia National Laboratories, pp. 1226-1231 (date unknown).

Article entitled: "*Non-isobaric bubble columns with variable gas velocity*," by Wolf-Dieter Deckwer, Institute for Technische Chemier, Berlin, Chemical Engineering Science, vol. 31, pp. 309-317, 1976, no month.

Article entitled: "*Analysis of the design of bubble-column reactors for Fischer-Tropsch synthesis*," by David Stern et al., American Chemical Society, pp. 1213-1219, 1985, no month.

Article entitled: "*Bubble column reactors and Fischer-Tropsch*," by S.C. Saxena, Catal. Rev.—Sci. Eng., 37(2), pp. 227-309, 1995, no month.

Article entitled: "*Gas holdup in slurry bubble columns: effect of column diameter and slurry concentrations*," by Rajamani Krishna et al.; AIChE. Journal, vol. 43, No. 2, pp. 311-316, Feb. 1997.

Article entitled: "*Fundamentals and selection of advanced Fischer-Tropsch reactors*," by S.T. Sie et al., Elsevier, Applied Catalyst A: General 186, pp. 55-70, 1999, no month.

Article entitled: "*Dynamic simulation of bubbly flow in bubble columns*," by Y. Pan et al., Pergamon, Chemical Engineering Science 54, pp. 2481-2489, 1999, no month.

Article entitled: "*Numerical simulation of gas-liquid dynamics in cylindrical bubble column reactors*," by Jayanta Sanyal et al., Pergamon, Chemical Engineering Science 54, pp. 5071-5083, 1999, no month.

Article entitled: "*Gas holdup and mass transfer in bubble column reactors operated at elevated pressure*," by H.M. Letzel et al., Pergamon, Chemical Engineering Science 54, pp. 2237-2246, 1999, no month.

Article entitled: "*Hydrodynamic simulation of methanol synthesis in gas-liquid slurry bubble column reactors*," by Yuanxiang Wu et al., Pergamon, Chemical Engineering Science 55, pp. 573-587, 2000, no month.

Hohn, K.L. & Schmidt, L.D. 'Partial oxidation of methane to syngas at high space velocities over Rh-coated spheres' *Applied Catalysis A: General*, vol. 211, Issue 1, pp. 53-68 (Mar. 2001).

E. Peluso et al 'Eggshell catalyst in Fischer-Tropsch synthesis: Intrinsic reaction kinetics' *Chemical Engineering Science*, vol. 56, Issue 4, pp. 1239-1245 (Feb. 2001).

Chang, J-R & Cheng, C-H 'Catalytic Properties of Eggshell Pd/δ-$Al_2O_3$ Catalysts for Isoprene-Selective Hydrogenation: Effects of Water Poisoning' *Industrial & Engineering Chemistry Research*; vol. 36, *issue* 10, pp. 4094-4099 (1997), no month.

Iglesia, E. et al. 'Synthesis and Catalytic Properties of Eggshell Cobalt Catalysts for the Fischer-Tropsch Synthesis' *Journal of Catlysis*, vol. 153, Issue 1, pp. 1-196 (Apr. 1995).

* cited by examiner

CATALYSTS FOR THE CONVERSION OF METHANE TO SYNTHESIS GAS

CROSS-REFERENCE TO RELATED APPLICATIONS

The present invention claims priority under 35 U.S.C. § 119(e) of U.S. Provisional Application Ser. No. 60/437,071, filed Dec. 30, 2002, and entitled "Improved Catalysts for the Conversion of Methane to Synthesis Gas". This application is related to commonly assigned, co-pending U.S. Utility Application Ser. No. 60/437,124 filed Dec. 30, 2002 entitled "Use of Nonmicroporous Support for Syngas Catalyst", which is hereby incorporated herein by reference.

STATEMENT REGARDING FEDERALLY SPONSORED RESEARCH OR DEVELOPMENT

Not applicable.

FIELD OF THE INVENTION

The present invention generally relates to catalysts and processes for the catalytic conversion of hydrocarbons (e.g., natural gas) to produce carbon monoxide and hydrogen (synthesis gas). More particularly, the invention relates to such catalysts and their manner of making, and to processes employing the catalysts for production of synthesis gas.

BACKGROUND OF THE INVENTION

Catalysis is the basis for many industrial/commercial processes in the world today. The most important aspect of a catalyst is that it can increase the productivity, efficiency and profitability of the overall process by enhancing the rate, activity and/or selectivity of a given reaction. Many industrial/commercial processes involve reactions that are simply too slow and/or efficient to be economical without a catalyst present. For example, the process of converting natural gas or methane to liquid hydrocarbons (a particularly desirable process for making liquid fuels) necessarily involves several catalytic reactions.

The conversion of methane or natural gas to hydrocarbons is typically carried out in two steps. In the first step, a methane-containing gas is converted into a mixture of carbon monoxide and hydrogen (i.e., "synthesis gas" or "syngas"). In a second step, the syngas intermediate is catalytically converted to higher hydrocarbon products, i.e., $C_{5+}$, by processes such as the Fischer-Tropsch Synthesis.

Current industrial use of methane or natural gas as a chemical feedstock proceeds by the initial conversion of the feedstock to carbon monoxide and hydrogen by for example, steam reforming (the most widespread process), dry reforming, autothermal reforming, gas heated reforming, partial oxidation, or catalytic partial oxidation. Examples of these processes are disclosed in GUNARDSON, HAROLD, *Industrial Gases in Petrochemical Processing* 41–80 (1998). An example of catalytic partial oxidation is shown in U.S. Published patent application No. 20020013227 to Dindi et al., both incorporated herein by reference for all purposes. Steam reforming, dry reforming, and catalytic partial oxidation proceed according to the following reactions with methane as hydrocarbon gas feedtock, respectively:

$$CH_4 + H_2O \leftrightarrow CO + 3H_2 \quad (1)$$

$$CH_4 + CO_2 \leftrightarrow 2CO + 2H_2 \quad (2)$$

$$CH_4 + 1/2O_2 \rightarrow CO + 2H_2 \quad (3)$$

While currently limited as an industrial process, catalytic partial oxidation (CPOX) has recently attracted much attention due to significant inherent advantages, such as the fact that heat is released during the process, in contrast to the endothermic steam and dry reforming processes.

The catalytic partial oxidation ("CPOX") of hydrocarbons, e.g., methane or natural gas, to syngas has also been described in the literature. In catalytic partial oxidation, natural gas or methane is mixed with air, oxygen-enriched air, oxygen blended with a diluent gas such as nitrogen, or substantially pure oxygen, and introduced to a catalyst at elevated gas hourly space velocity, temperature and pressure to generate a syngas product, wherein syngas comprises a mixture of hydrogen ($H_2$) and carbon monoxide (CO). As shown in Equation (3), the partial oxidation of methane yields a syngas product with a $H_2$:CO molar ratio close to 2:1, which is more useful for the downstream conversion of syngas to chemicals such as methanol or to hydrocarbons such as liquid fuels, waxes, and/or lubricating oils, than is the 3:1 $H_2$:CO ratio from steam reforming. However, both reactions continue to be the focus of research in the world today.

As stated above, these reactions are catalytic reactions and the literature is replete with varying catalyst compositions. The more preferred catalytic metals are Group VIII or noble metals, such as rhodium, platinum, or palladium. These metals are sometimes combined with secondary metals (also called promoter metals) to enhance their activity. Further, the catalyst compositions may include a support material such as alumina, silica, titania, zirconia, and the like.

Partial oxidation catalysts are generally prepared by uniformly dispersing one or more catalytic metal throughout a catalyst support matrix. One problem with this type preparation is that some preferred catalytic metals, e.g., Rh, Pt, Pd, are typically expensive. Regardless of how expensive or how high the loading, uniform dispersion inherently exiles a substantial amount of catalytic metal to the deep internal surfaces or "core" of a support. For purposes of this disclosure "deep internal surfaces" or "core" is intended to mean the region of the catalyst structure that is deeper than the smaller of (1) 300 μm as measured from the catalyst exterior surface or (2) the outer 30% of the catalyst volume as measured from the catalyst exterior surface directly inwards toward the center of the structure. It should be appreciated that volume here and further herein is contemplated to include both the solid and pore volumes that make up a particle structure. The catalyst metal exiled in this manner creates at least two disadvantages. First, catalytic metal inside the core region of the catalyst support structure will be underutilized. This is especially true in high space velocity reactors where only a relatively small fraction of the reactant gases are able to reach the core region. A second disadvantage is that the any products formed inside the core region will have to diffuse out of the core and the outer layer surrounding the core. The time it takes for the products formed inside the core region to leave the catalyst particle is significantly greater relative to the products formed at or near the exterior surface of the catalyst. More specifically, the difference is equal to the added time it takes for the products to diffuse out of the core. Thus, a further disadvantage is that the possibility for undesired side reactions becomes greater because the products and the reactants are exposed to active catalyst material for a longer period of time.

Applicants theorize, without wishing to be bound by the theory, that in processes having very high reactant space velocities, such as, for example, the catalytic partial oxidation of methane, the inner part of the catalyst particles (e.g., core) do not significantly contribute to the overall reaction productivity. In fact, Applicants postulate that the undesired secondary reactions are predominant in the inner region. Therefore, the chemical activity in the core of the catalyst particle will have the undesirable effects set forth above such as affecting the $H_2$:CO molar ratio, lowering the $H_2$ and CO selectivities, and increasing the reaction temperature. Additionally, the catalytic metal inside the inner core of the catalyst is underutilized with respect to the desired reactions. Therefore, the catalyst metal dispersed in the inner core of the particles contributes significantly to the cost without contributing significantly to the productivity, and indeed potentially decreasing the productivity, of the reactor.

Non-porous material (defined as a material with a surface area of less than 1 $m^2$/g) would typically provide a catalyst core without significant diffusion of reactants/products and thus would overcome the production of undesirable by-products. However, the use of a non-porous support material for the catalyst core is not an acceptable solution, because non-porous materials do not have a sufficient amount of surface area on which to disperse the catalytic material. In addition, lack of sufficient surface area can prevent the reactions from igniting.

Thus, there is a desire to have a syngas production process, which minimizes the amount of expensive catalytic material in the core of catalyst particles and also limits access of the core to the reactants, thus limiting the extent of the occurrence of the undesirable secondary reactions and minimizing the effects of those undesirable reactions. Accordingly, research has focused on developing new catalysts that can reduce or eliminate the problems associated with the prior art catalysts. The approach taken is to more effectively using smaller amounts of catalytic metal or using the catalytic metals more efficiently while maintaining the required minimum amount of surface area. The present invention has been developed with these considerations in mind and is believed to be an improvement over the catalyst systems in the prior art.

SUMMARY OF THE INVENTION

The present invention is directed towards improved catalyst systems, as well as methods of making and using such systems. The present invention provides a syngas catalyst system comprising a core and an outer layer comprising a catalytically active metal, in which effective use of the catalyst metal is enhanced and the occurrence of undesirable secondary reactions is inhibited. The invention achieves this result by minimizing diffusion of the reactant gases into the core of the catalyst particle. Thus, the reactant gases are not allowed to linger in the particle core and react unfavorably, and the expensive catalytically active materials are only placed where their presence is most economically beneficial.

In particular, preferred embodiments of the present invention comprise new partial oxidation catalysts and methods of preparing and using said catalysts. Accordingly, the present invention also encompasses an improved method for converting a hydrocarbon containing gas and an oxygen containing gas to a gas mixture comprising hydrogen and carbon monoxide, i.e., syngas, using catalyst systems in accordance with the present invention. In addition, the present invention contemplates an improved method for converting hydrocarbon gas to liquid hydrocarbons using the novel syngas catalysts described herein.

The preferred embodiments include a partial oxidation catalyst in which wherein at least 60% of the catalytically active metal is located within 300 μm from the catalyst exterior surface. In a more preferred embodiment, the present invention comprises a catalyst having a catalytically active metal load of about 1 wt % or less, preferably of about 0.75 wt % or less, more preferably of about 0.5 wt % or less, on a support wherein at least 60% of the catalytically active metal is located within 300 μm from the catalyst exterior surface.

A particular preferred embodiment comprises a partial oxidation catalyst compositions capable of high methane and carbon monoxide selectivities comprising rhodium as the catalytic metal, with a rhodium loading of about 1 wt % or less, preferably of about 0.75 wt % or less, more preferably of about 0.5 wt % or less. The preferred reaction is partial oxidation of light hydrocarbons, particularly natural gas or methane to form synthesis gas, but the support is equally useful in any oxidative reactions such as conversion of a gaseous alkane to its corresponding olefin.

The present invention further relates to methods for preparing catalyst compositions in accordance with the present invention. For example, a method for preparing nonmicroporous catalyst particles, each having a core comprising a refractory support like alumina or zirconia and an outer layer, includes applying a pore blocking material such as silicic acid or sodium carbonate to the support material, so as to substantially block the micropores of the support material and obtain a nonmicroporous core of the catalyst particle. The particles are then provided a catalytically active material for catalyzing reactions, wherein the catalytically active material preferably comprises a Group VIII metal like rhodium and optionally a promoter metal such as a lanthanide metal or rhenium, dispersed in the outer layer, wherein the catalytically active material does not substantially penetrate and deposit into the core because of the blocked pores. Another embodiment involves preparing catalysts using an impregnation technique employing a fast drying or low vapor pressure solvent, which allows preferential deposition of the active material in an outer layer, preferably deposited on the outer surface of the support.

Methods for carrying out partial oxidation reactions using the catalyst compositions described above. The preferred process comprises the production of a synthesis gas from one or more gaseous hydrocarbons. The process comprises passing a hydrocarbon containing gas and an oxygen containing gas over a partial oxidation catalyst containing the catalyst system described above under conditions effective to produce a gas stream comprising hydrogen and carbon monoxide.

The present invention also comprises a conversion process utilizing a hydrocarbon gas as feed to produce higher molecular weight hydrocarbons (such as $C_{5+}$ hydrocarbons comprising five carbon atoms or more). At least a portion of the synthesis gas stream produced as described above is reacted with a hydrocarbon synthesis catalyst in a hydrocarbon synthesis reactor under conditions effective to produce $C_{5+}$ hydrocarbons. In a preferred embodiment, a gas to liquid conversion process is carried out using the syngas process described herein and a Fischer-Tropsch synthesis reaction. In another embodiment, a portion of the syngas may be converted to methanol and/or other alcohols using the syngas process described herein and an alcohol synthesis.

These and other embodiments, features and advantages of the present invention will become apparent with reference to the following detailed description and drawings.

BRIEF DESCRIPTION OF THE DRAWINGS

For a more detailed understanding of the present invention, reference is made to the accompanying Figure, wherein.

DETAILED DESCRIPTION OF THE PREFERRED EMBODIMENTS

Herein will be described in detail, specific embodiments of the present invention, with the understanding that the present disclosure is to be considered an exemplification of the principles of the invention, and is not intended to limit the invention to that illustrated and described herein. The present invention is susceptible to embodiments of different forms or order and should not be interpreted to be limited to the particular structures, methods or compositions described herein. In particular, various embodiments of the present invention provide a number of different configurations of the overall gas to liquid conversion process.

The present invention relates to improved catalyst systems. The present invention also comprises methods of preparing and using the catalyst systems. The present invention is more preferably directed towards syngas catalysts used in partial oxidation reactions and even more preferably used in syngas catalysts that contain Group VIII or noble metals. However, it should be appreciated that the catalyst systems according to the present invention are useful for other partial oxidation reactions, which are intended to be within the scope of the present invention. In addition, the present invention contemplates an improved method for converting hydrocarbon gas to $C_{5+}$ hydrocarbons using the novel syngas catalyst systems described herein. Thus, the invention also relates to processes for converting hydrocarbon-containing gas to $C_{5+}$ hydrocarbons via an integrated syngas to Fischer-Tropsch process.

One embodiment of the present invention is for a catalyst system in which the majority of the catalytic metal is near the surface of the support matrix. In other words, the catalyst is not uniformly dispersed throughout the catalyst matrix, but instead has regions of differing catalyst concentration. For example, as show in FIG. 1, the support could have more than one discrete region comprising differing catalyst concentrations. As shown, the spherical catalyst system 10 has two regions 20 and 30. Region 20 is the inner core, and region 30, also called outer layer, is the area at the periphery of the core. Region 30 is delimited by exterior surface 50 of catalyst system 10 and outer surface 40 of the region 20. In the broadest and simplest terms and in accordance with the present invention, region 20 should have a lower amount of catalyst than region 30. In other words, the catalyst material should be distributed such that if region 20 and 30 were divided into two sections of equal volume, i.e., 50—50, more than 50% of the catalytically active material would be located in region 30. In a preferred embodiment, region 20 would comprise substantially lower amounts of catalyst than region 30. The general objective being that more than 50% of the catalytically active material is located in a contiguous region of the support that comprises 50% or less of the total support volume. In a more preferred embodiment, region 20 would have substantially zero catalytic material.

Figure 2:
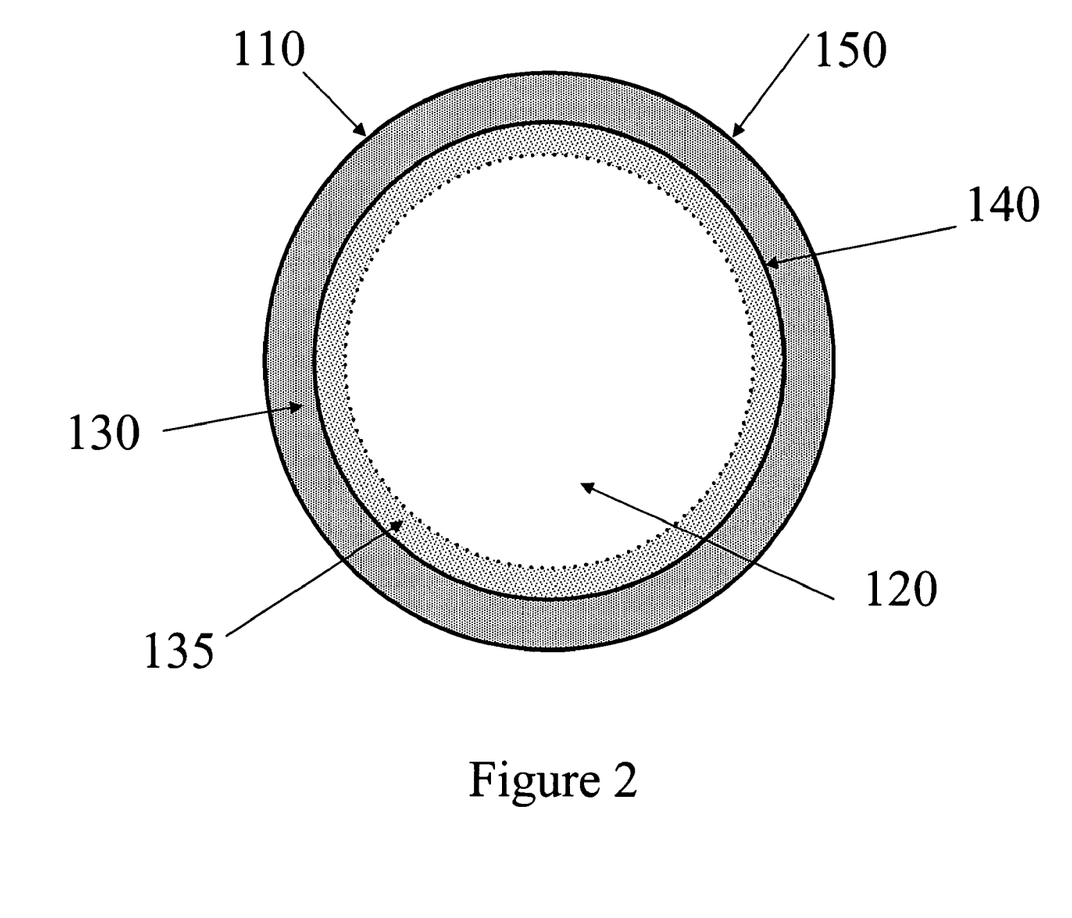
FIG. 2 shows a catalyst particle in accordance with one embodiment of the present invention.

In another embodiment of the present invention shown in FIG. 2, a catalyst particle 110 has a core 120 with an outer surface 140, a catalytic outer layer 130 with an exterior surface 150, and a substantially blocked-micropore layer 135. The substantially blocked-micropore layer 135 substantially prevents access to deposition of catalytic material in internal surface of core 120 of the catalyst particle 110. Thus, catalyst material are deposited primarily only on the outer surface 140 of the core 120 and form the outer layer 130. The substantially blocked-micropore layer 135 can be of any thickness, so long as it substantially blocks access of the catalytic material to the core 120 of the catalyst particle 110. It is preferred that the catalytic layer 130 be not more than 300 micron thick, and greater than 0.5 micron thick.

Figure 1:
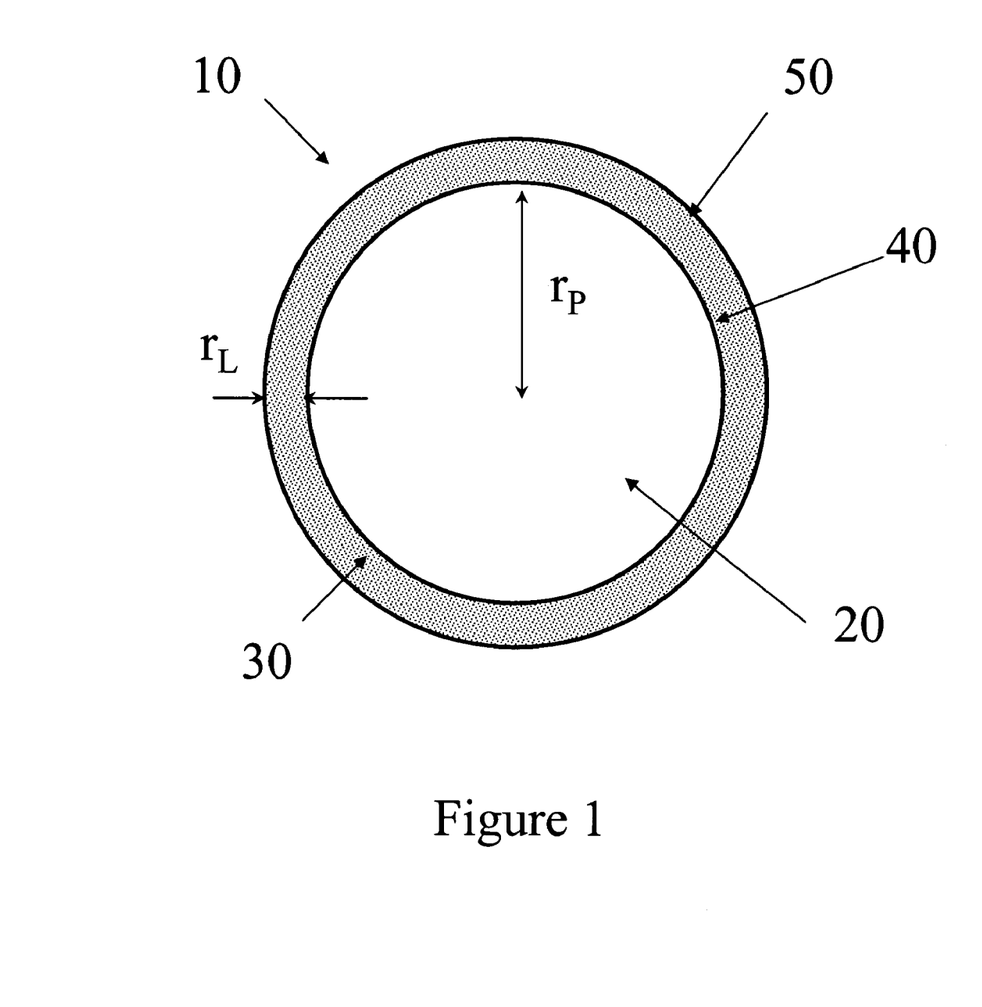
FIG. 1 shows a catalyst particle in accordance with one embodiment of the present invention.

Referring now back to FIG. 1, a catalyst particle 10 in accordance with the first embodiment of the present invention includes a catalytic outer layer 30. The particle 10 of FIG. 1 differs from particle 110 of FIG. 2 in that the substantially blocked-micropore layer of particle 10 extends substantially throughout the core 20 of the particle 10.

Figure 3:
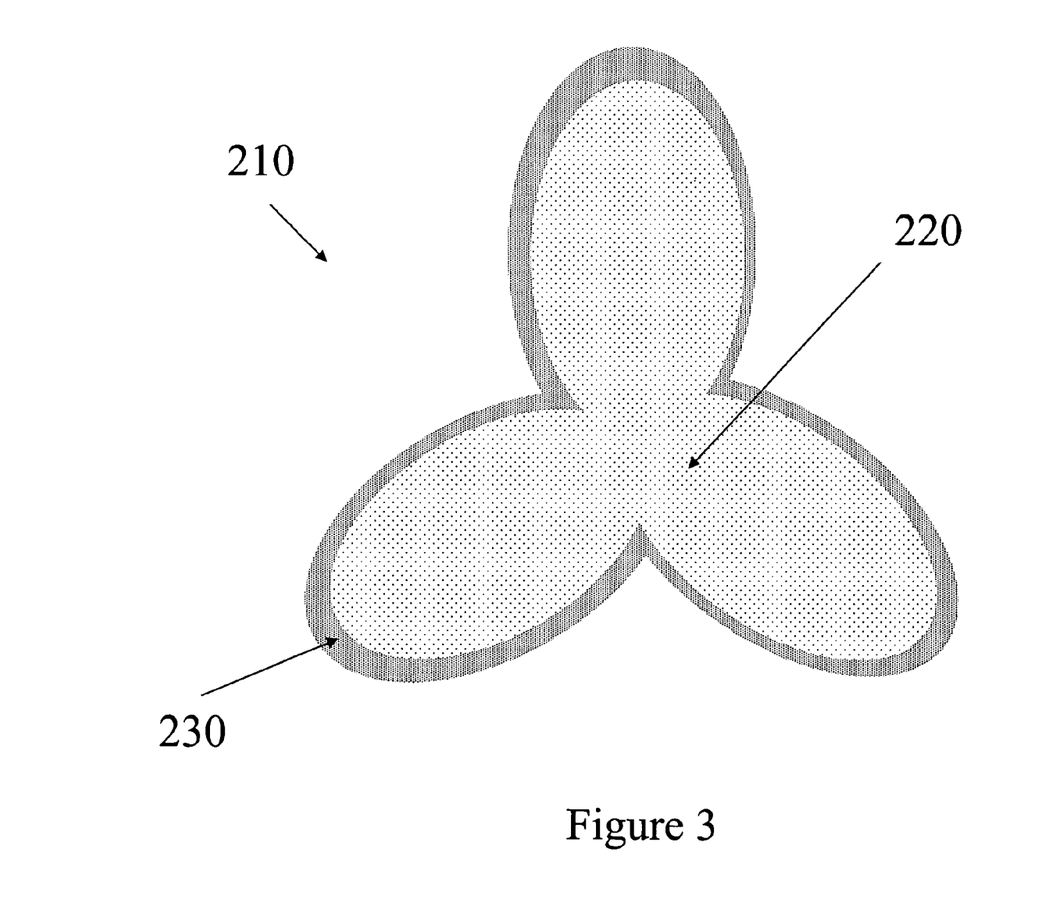
FIG. 3 shows a trilobe catalyst particle in accordance with one embodiment of the present invention.

Referring now to FIG. 3, another embodiment of a catalyst particle 210 has a trilobe configuration with a core 220 and an outer layer 230 comprising most of the catalytic material. As in the particle of FIG. 1, the blocked-micropore layer extends through substantially the entire core 220 of the particle 210, such that the catalytic material does not substantially penetrate into the core 220 of the particle 210 during the preparation of the catalyst.

It should be appreciated that discrete regions are difficult to produce in practice and a more practical approach may be to create a gradient of catalyst concentration with the highest concentration near the exterior surface and essentially zero near the center of the core. Again, producing a catalyst in which the majority of active catalyst material is near the exterior surface. It should also be appreciated that although a spherical-shape structure for the support is illustrated in FIGS. 1–2 and a trilobe-shape structure for the support is illustrated in FIG. 3, the present invention is not intended to be so limited and is equally applicable to any shape so long as the catalytic material is predominately in the region that is delimited by the outer surface of the core and the exterior surface of the catalyst. In addition, some combination of discrete and graduated regions could be used.

In another embodiment, catalyst systems that have less than 60% of their total volume within 300 μm of the catalyst support outer surface should have at least 60% of the catalytically active metal located within 300 μm of the catalyst exterior surface, preferably wherein about 75% of the catalytically active metal is located within 250 μm of the catalyst exterior surface, and still more preferably 80% of the catalytically active metal is located within 200 μm of the catalyst exterior surface. By locating the catalytic metal near the outer surface of the support, a larger percentage of expensive catalytic metal can be more efficiently used because less of the metal will be exiled to the core and fewer side reactions are possible because fewer undesirable products will be formed in the core. It should be understood that for the present disclosure depositing at or near the outer surface of a support particle may include (1) on it's outer surface causing an "extension" of the surface with continued buildup of catalyst material, (2) on the outer surface and inside the pores and/or pore surfaces such that little buildup, if any, occurs, or (3) some combination of the two, e.g., some deposition within the pores with an average buildup on the outer surface.

In addition, an increase in the amount of catalytic metal that is located near the exterior surface of the catalyst may decrease the overall amount of catalytic metal that is needed to prepare an efficient catalyst system. Thus, another preferred embodiment of the present invention comprises a catalyst system wherein the catalytically active metal, e.g., rhodium, loading is preferably 1 wt % or less, more preferably 0.75 wt % or less and still more preferably 0.5 wt % or less. By using a smaller loading of catalytic metal, the present invention has the advantage of greatly reducing the cost associated with the expensive metals.

By combining the above-identified features, the present invention becomes a significant improvement over catalysts with more uniform dispersions of catalytic metal and higher catalyst loadings on the internal surface of a support material. Accordingly, in another preferred embodiment, the catalyst systems of the present invention comprise catalytically active metal loadings of preferably 1 wt % or less, more preferably 0.75 wt % or less and still more preferably 0.5 wt % or less, wherein more than 50% of the catalytically active material is located in a contiguous region of the support that comprises 50% or less of the total support volume and wherein that region contains all of the outer surface of the support. In another embodiment, it is preferred that catalyst systems that have less than 60% of their volume within 300 μm of the catalyst exterior surface comprise catalytically active metal loadings of preferably 1 wt % or less, more preferably 0.75 wt % or less and still more preferable 0.5 wt % or less, wherein at least 60% of the catalytically active metal is located within 300 μm of the catalyst exterior surface, preferably wherein about 75% of the catalytically active metal is located within 250 μm of the catalyst exterior surface, and still more preferably 80% within 200 μm of the catalyst exterior surface The preferred catalytic metals are Group VIII, noble metals and/or mixtures thereof, or rhenium, more preferably iridium, rhenium, or rhodium, still more preferably rhodium. In addition, the catalyst composition may contain promoters or other secondary metals. Suitable promoters or other secondary metals are well known in the art and are not critical to the invention. Without being limited to any particular promoter or secondary metal, some suitable ones include lanthanides, Group VIII metals and/or any mixtures thereof. The support material may comprise any well known in the art, such as refractory support materials like alumina, titania, zirconia, and the like, preferably alumina. The term porous support material as used herein is meant to include all supports that have a preferred initial surface area of at least 2 $m^2/g$ and preferably at least 5 $m^2/g$. The support structures may be monoliths, particulates or any other shape or form that can be prepared from the compositions of the present invention. Often, the shape or form selected will dictate the type of catalyst bed that must be used. For example, fixed beds are comprised of monoliths and large particle sized supports (greater than 0.5 mm, preferably greater than about 1 mm). Small-size support particles (less than 0.5 mm, preferably less than 0.25 mm) tend to be more useful in fluidized beds. The more preferred embodiments of the present invention comprise fixed bed reactors having large to medium sized particulate type supports.

Figure 4:
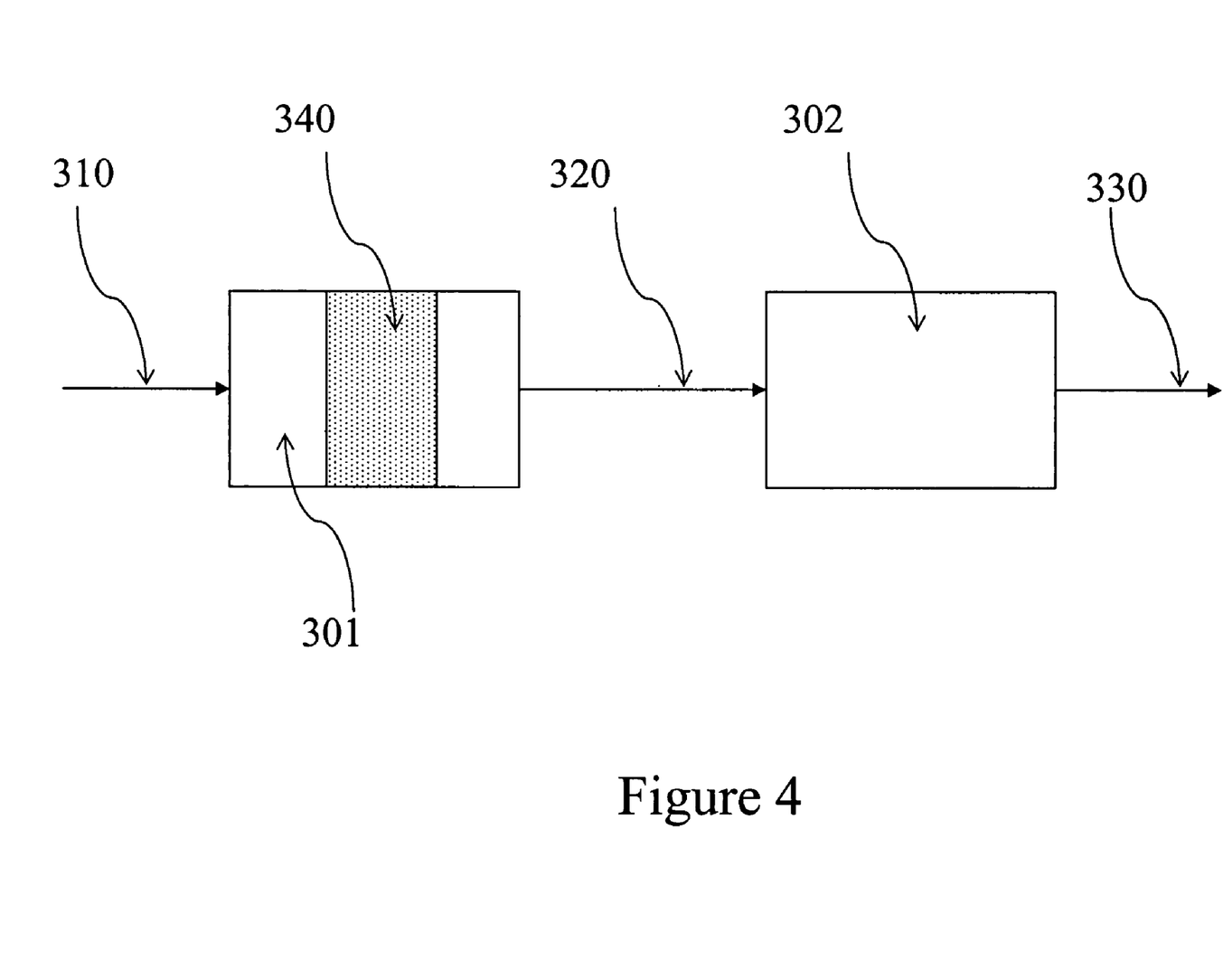
FIG. 4 shows a flow diagram for a hydrocarbon gas to liquids reactor system.

Referring now to FIG. 4, a reactor system in which the particle of the present invention might be used includes a feed stream 310, a syngas reactor 301, a catalytic reaction zone 340, an intermediate syngas stream 320, a Fischer-Tropsch reactor 302, and a product stream 330. Gaseous feed stream 310, comprising a hydrocarbon portion, preferably methane, mixtures of C1–C5 hydrocarbons, or natural gas, and an oxygen-containing portion, preferably air or oxygen-enriched air, oxygen diluted with a diluent gas such as nitrogen, or more preferably substantially pure oxygen, is fed into syngas reactor 301. Syngas reactor 301 houses a plurality of catalyst particles such as those of FIG. 1, FIG. 2, or FIG. 3, wherein the catalytic material does not substantially penetrate into the core of the catalyst particle. Reaction zone 340 is operated in conditions favorable such that at least a portion of said hydrocarbon of the feed stream 310 are converted to syngas comprising hydrogen and carbon monoxide to produce intermediate syngas stream 320. Intermediate syngas stream 320 preferably comprises primarily syngas, but may comprise other components such as water, carbon monoxide, and unconverted reactants. Intermediate syngas stream 320 is then fed to a hydrocarbon synthesis reactor 302 where preferably a Fischer-Tropsch synthesis takes place to convert the syngas to product stream 330, preferably comprising primarily higher hydrocarbons, such as in the '544 Patent to Herron, et al incorporated herein by reference in its entirety.

For all of the embodiments according to the present invention, the catalyst systems should preferably maintain high conversion and selectivity values. Accordingly, catalyst systems of the present invention preferably exhibit a hydrocarbon gas conversion of greater than or equal to 80%, more preferably greater than or equal to 85%, and still more preferably greater than or equal to 90%. Likewise, the catalyst systems of the present invention preferably exhibit hydrogen and carbon monoxide selectivities of greater than or equal to 80%, more preferably greater than or equal to 85%, and still more preferably greater than or equal to 90%.

Methods for the preparation of the catalyst systems described herein are not critical. Any method by which the catalytic metal can be dispersed within the catalyst matrix in accordance with the present invention will be sufficient. For example, the following known techniques have been found to be useful in either blocking the pores of a porous support or preferentially depositing catalytic material near the outer surface of the porous catalyst support: (i) applying a solution of a pore-blocking agent such as silicic acid or sodium carbonate, to the support particle, and calcining the catalyst particle such that a substantial portion of micropores of the particle are filled or blocked; (ii) immersion in water followed by drying at a temperature ranging from about 150° F. to about 300° F. in a microwave oven, or the like, and then calcining in air; (iii) using a fast drying or low vapor pressure solvent during an impregnation step; and (iv) impregnation of "egg yolks" by selecting an appropriate combination of a metal compound, redox reaction and type of support, e.g., hydroxyl ion-generating redox reaction with an acidic reacting support or a hydrogen ion-generating redox reaction with a basic support.

A fast drying solvent may include any solvent with a low vapor pressure (at normal temperature and pressure) provided that the catalytic metal precursors are solvable in that solvent. For example, suitable solvents may include, but are not limited to, alcohols, such as methanol, ethyl alcohol, iso- or n-propanol, butanol and the like, acetone, or toluene. Using a fast drying solvent preferentially deposits catalytic metal precursors on and/or near the outer surface of the support because of the rapid drying of the solvent. The techniques described herein are not exhaustive of techniques useful to the present invention and are merely listed as examples of the preferred techniques. Many others exist, are known or can be created by those of ordinary skill in the art to perform the same function and get the same or similar result.

Accordingly, one of the preferred embodiments of the present invention is an improved process for converting a hydrocarbon containing gas and an oxygen containing gas to a gas mixture comprising hydrogen and carbon monoxide, ie., syngas. The process comprises using the improved catalyst compositions described herein in a partial oxidation reaction such as the syngas synthesis reaction described above. The preferred reaction is a syngas type reaction, but other reactions, such as oxidative dehydrogenation, are also well suited for the catalyst systems of the present invention. The following is a description of a method for producing syngas according to the present invention using the catalyst systems described herein.

As mentioned above, a syngas reaction is basically a reaction of a fuel or hydrocarbon containing gas and an oxygen containing gas to produce a syngas stream comprising primarily hydrogen and carbon monoxide. Regardless of the source, the hydrocarbon-containing feed and the oxygen-containing feed are reacted in a syngas or other reactor under catalytic conditions effective to produce the desired products. The syngas reactor can comprise any of the synthesis gas technology and/or methods known in the art. The hydrocarbon-containing feed is preferably obtained as natural gas. However, the most important component is generally methane. Methane or other suitable hydrocarbon feedstocks (hydrocarbons with four carbons or less) are also readily available from a variety of other sources such as higher chain hydrocarbon liquids, coal, coke, hydrocarbon gases, etc., all of which are clearly known in the art. Similarly, the oxygen-containing gas may come from a variety of sources and will be somewhat dependent upon the nature of the reaction being used. For example, a partial oxidation reaction requires diatomic oxygen as a feedstock, while steam reforming and dry reforming requires only steam and carbon dioxide, respectively. According to the preferred embodiment of the present invention, partial oxidation is assumed for at least part of any syngas reaction or method involving a syngas reaction disclosed herein. In the most preferred embodiment, the reaction will comprise a high space velocity catalytic partial oxidation where the GHSV is greater than 100,000 $hr^{-1}$.

The gas feedstocks are generally preheated, mixed and passed over or through the catalyst beds. As the mixed feedstocks contact the catalyst, the synthesis reactions take place. The synthesis gas product contains primarily hydrogen and carbon monoxide, however, many other minor components may be present including steam, nitrogen, carbon dioxide, ammonia, hydrogen cyanide, etc., as well as unreacted feedstocks, such as methane and/or oxygen. The synthesis gas product, i.e., syngas, is then ready to be used, treated, or directed to its intended purpose. For example, in the instant case some or all of the syngas is preferably used as a feedstock for a Fischer-Tropsch process.

Accordingly, one of the preferred embodiments of the present invention is an improved method for producing $C_{5+}$ hydrocarbons by sending the syngas product, prepared using the novel catalyst systems described herein, to a hydrocarbon synthesis reactor such as a Fischer-Tropsch reactor.

Syngas is typically at a temperature of about 600–1500° C. when leaving a syngas reactor. The syngas must be transitioned to be useable in a Fischer-Tropsch or other hydrocarbon synthesis reactors, which operate at lower temperatures of about 200° C. to 400° C. The syngas is typically cooled, dehydrated (i.e., taken below 100° C. to knock out water) and compressed during the transition phase. Thus, in the transition of syngas from the syngas reactor to a Fischer-Tropsch reactor, the syngas stream may experience a temperature window of 50° C. to 1500° C.

The Fischer-Tropsch reactor can comprise any of the Fischer-Tropsch technology and/or methods known in the art. The Fischer-Tropsch feedstock is hydrogen and carbon monoxide, i.e., syngas. The hydrogen to carbon monoxide molar ratio is generally deliberately adjusted to a desired ratio of approximately 2:1, but can vary between 0.5 and 4. The syngas is then contacted with a Fischer-Tropsch catalyst. Fischer-Tropsch catalysts are well known in the art and generally comprise a catalytically active metal, a promoter and a support structure. The most common catalytic metals used in Fischer-Tropsch catalysts are Group VIII metals, such as cobalt, nickel, ruthenium, iron or mixtures thereof. When the Fischer-Tropsch catalyst is supported, the support comprises generally alumina, titania, silica, zirconia or mixtures thereof. Fischer-Tropsch reactors use fixed and fluid type conventional catalyst beds as well as slurry bubble columns. The literature is replete with particular embodiments of Fischer-Tropsch reactors and Fischer-Tropsch catalyst compositions, such as the '544 Patent to Herron et al. (discussed above). Preferred operating conditions of a slurry bubble Fischer-Tropsch reactor are disclosed in U.S. published patent application 2003/0114543, which is incorporated herein in its entirety. As the syngas feedstock contacts the catalyst, the hydrocarbon synthesis reaction takes place. The Fischer-Tropsch product contains a wide distribution of hydrocarbon products from $C_5$ to greater than $C_{100}$.

EXAMPLES

Catalyst Examples A–H were prepared in accordance with the present invention. Each was prepared using the following general procedure. A selected support material having an appropriate surface area, i.e., at least 2 $m^2/g$, and preferably at about 4–5 $m^2/g$, was impregnated with a sodium carbonate solution by incipient wetness. The sodium carbonate solution ranged from 1–5 wt %. The impregnated support materials were then dried in an oven for 3 hours at 150° C. The dried supports were then impregnated with an aqueous solution of $RhCl_3 \cdot xH_2O$ and $SmCl_3 \cdot 6H_2O$ using an appropriate quantity to achieve incipient wetness with the desired loading of Rh and Sm, except for Example B, where the dried alumina was next impregnated with an aqueous solution of $Rh(NO_3)_3$, $ReCl_3$, $ZrO(NO_3)_2$ . . . $xH_2O$ using an appropriate quantity to achieve incipient wetness with the desired loading of Rh, Re and Zr. Other promoters can be added in like manner as desired. Because of the presence of the sodium carbonate, the Rh and promoter metals were deposited in the outer radial portion of the support structure. The catalyst compositions were then washed with distilled water to remove sodium. The catalyst samples were then dried in an oven for 2 hours at 120° C. and calcined in air for 2 hours at 800° C. Table 1 lists the type of support, surface area and particle size, as well as the concentration of the sodium carbonate solution used in the preparation of these Examples, and the catalytic material (Rhodium, promoters) loadings.

TABLE 1

Catalyst Compositions

| Catalyst Ex. | Support | Sodium carbonate used | Loading Rhodium | Promoter(s) |
|---|---|---|---|---|
| A | Alpha-alumina (Sasol); 5.1 m$^2$/g; 0.3–0.6 mm granules | 3% | 0.5% | 0.5% Sm |
| B | Alpha-alumina (Norpor-Saint-Gobain); 4.4. m$^2$/g; 1 mm granules; | 4% | 1.0% | 0.05% Re, 0.05% Zr |
| C | Alpha-alumina (Norpor-Saint-Gobain); 4.4. m$^2$/g; 1 mm granules | 4% | 0.75% | 0.5% Sm |
| D | Alpha-alumina; 5.1 m$^2$/g; 1.6 mm extrudate; trilobes | 5% | 0.5% | 0.5% Sm |
| E | Alpha-alumina (Sasol); 5.1 m$^2$/g; 0.3–0.6 mm granules | 2% | 0.5% | 0.5% Sm |
| F | Alpha-alumina (Sasol); 5.1 m$^2$/g; 0.3–0.6 mm granules | 1% | 0.5% | 0.5% Sm |
| G | Alpha-alumina (Sasol); 5.1 m$^2$/g; 0.3–0.6 mm granules | 2.5% | 0.5% | 0.5% Sm |
| H | Alpha-alumina (Sasol); 5.1 m$^2$/g; 0.3–0.6 mm granules | 1.75% | 0.5% | 0.5% Sm |

The catalyst Examples A–D shown in Table 1 were evaluated for their ability to catalyze a partial oxidation reaction in a conventional flow apparatus using a quartz reactor with a length of 12 inches (300 mm), an outside diameter of 19 mm and an inside diameter of 13 mm. Ceramic foam pieces of 99% Al$_2$O$_3$ (12 mm outside diameter×5 mm thick, with 45 pores per linear inch) were placed before and after the catalyst as radiation shields. Runs were conducted at a pressure of 5 psig (136 kPa) in which an oxygen/methane volumetric ratio of 0.55 was introduced to a catalyst bed comprised of the prepared catalyst Examples. In all runs, the inlet temperatures for the reactant gases were kept at ~300° C. Two flow rates were used and held constant at either 3,500 cc/min or 5,000 cc/min. The catalyst bed height was fixed at 9.5 mm. The reactor effluent was analyzed using a gas chromatograph equipped with a thermal conductivity detector. The results of the test runs were obtained after at least 6 hours on stream at the specified conditions and are shown in Table 2.

TABLE 2

Reactivity Data of Rhodium Catalysts

| Catalyst | Flow Rate | Exit Temp (° C.) | CH$_4$ Conversion (%) | H$_2$ Selectivity (%) | CO Selectivity (%) | H$_2$/CO in syngas product |
|---|---|---|---|---|---|---|
| A | 3500 | 772 | 94.9 | 88.3 | 96.3 | 1.83 |
|   | 5000 | 789 | 95.2 | 87.4 | 96.7 | 1.81 |
| B | 3500 | 730 | 93.2 | 87.0 | 95.8 | 1.82 |
|   | 5000 | 764 | 93.3 | 87.8 | 96.1 | 1.83 |
| C | 3500 | 778 | 91.6 | 94.4 | 95.8 | 1.97 |
|   | 5000 | 817 | 91.4 | 90.6 | 96.3 | 1.88 |
| D | 3500 | 669 | 95.0 | 93.0 | 93.0 | 1.93 |
|   | 5000 | 702 | 94.9 | 92.1 | 92.1 | 1.91 |

The data in Table 2 shows that the catalytic performance of the rhodium catalyst systems prepared in accordance with the present invention are comparable to other catalysts in the art with much higher catlytic metal loadings, such as those disclosed in U.S. published patent application 2002/0115730, which is incorporated herein by reference in its entirety.

The examples and testing data show that the catalyst compositions of the present invention are an improvement over prior art catalysts in their ability to maintaining high methane conversion and hydrogen and carbon monoxide selectivity values with very low amounts of expensive catalytic metal.

Whiled the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all issued patents, patent applications and publications cited herein are incorporated by reference.

What is claimed is:

1. A process for producing synthesis gas comprising:
   passing a hydrocarbon containing gas and an oxygen containing gas over a partial oxidation catalyst, under conditions effective to produce a gas stream comprising hydrogen and carbon monoxide,
   wherein the partial oxidation catalyst comprises a catalytic metal and a support material;
   wherein the partial oxidation catalyst includes a plurality of discrete structures, each comprising a core containing said support material and an outer region disposed on said core;
   wherein the plurality of discrete structures has an average size greater than 0.5 mm;
   wherein the outer region has an thickness of not more than 200 microns, and further
   wherein more than 60% of the catalytically active metal loaded on the discrete structure is located in the outer region
   further wherein the catalyst comprises a substantially blocked-micropore layer disposed between the outer region and the center of the core, said substantially blocked-micropore layer being either at the periphery of the core or extended substantially throughout the core.

2. The process according to claim 1 wherein the catalytic metal comprises a Group VIII metal or noble metal.

3. The process according to claim 1 wherein the catalytic metal comprises rhodium.

4. The process according to claim 3 wherein the catalytic metal comprises about 1 wt % or less of the total catalyst weight.

5. The process according to claim 3 wherein the catalytic metal comprises about 0.75 wt % or less of the total catalyst weight.

6. The process according to claim 1 wherein 80% of the catalytic metal is located within the outer region.

7. The process according to claim 1 wherein the outer region thickness is no greater than 100 microns.

8. The process according to claim 1 wherein the support material comprises alumina.

9. The process according to claim 1 wherein the partial oxidation catalyst exhibits a methane conversion of greater than or equal to 80 mole %.

10. The process according to claim 1 wherein the partial oxidation catalyst exhibits a hydrogen selectivity of greater than or equal to 80 mole %.

11. The process according to claim 1 wherein the partial oxidation catalyst exhibits a carbon monoxide selectivity of greater than or equal to 80 mole %.

12. The process according to claim 1 wherein the hydrocarbon containing gas and an oxygen containing gas over the catalyst is done at a GHSV greater then 100,000 hr$^{-1}$.

13. The process according to claim 1 wherein the hydrocarbon containing gas comprises methane.

14. The process according to claim 1 wherein 80% of the catalytic metal is located within the outer region.

15. The process according to claim 1 wherein the catalytically active metal is iridium, rhenium, or rhodium.

16. The process according to claim 15 wherein the catalytically active metal comprises about 1 wt % or less of the total catalyst weight.

17. The process according to claim 15 wherein the catalytically active metal comprises about 0.75 wt % or less of the total catalyst weight.

18. The process according to claim 15 wherein the catalytically active metal comprises about 0.5 wt % or less of the total catalyst weight.

19. The process according to claim 3 wherein the catalyst further comprises a promoter selected from the group consisting of lanthanide metals, rhenium, zirconium, and combinations thereof.

20. The process according to claim 3 wherein the catalyst further comprises a promoter selected from the group consisting of rhenium, zirconium, and combinations thereof.

21. The process according to claim 3 wherein the catalytic metal comprises about 0.5 wt % or less of the total catalyst weight.

22. The process according to claim 1 wherein the outer region is delimited by the exterior surface of the catalyst structure; the core comprises the center of the structure; and wherein the catalyst comprises a gradient in catalytically active metal concentration with the highest concentration near said exterior surface and essentially zero near said center.

23. The process according to claim 1 wherein the outer region comprises rhodium and a promoter selected from the group consisting of samarium, rhenium, zirconium, and combinations thereof.

24. The process according to claim 1 wherein the catalyst further comprises a promoter, and more than 60% of the promoter loaded on the discrete structure is located in the outer region.

25. The process according to claim 1 wherein more than 80% of the catalytic metal is located within the outer region.

26. The process according to claim 1 wherein the outer region is a catalytic outer layer greater than 0.5 micron thick.

27. The process according to claim 1 wherein said substantially blocked-micropore layer is disposed at the periphery of the core.

28. The process according to claim 1 wherein the substantially blocked-micropore layer is created before the loading of the catalytically active metal by a method comprising applying silicic acid or sodium carbonate to the support material and then calcining.

29. The process according to claim 1 wherein the discrete structures are particles with a trilobe configuration.

30. The process according to claim 1 wherein the discrete structures are particles with a spherical configuration.

31. The process according to claim 1 wherein the discrete structures are particles having a size greater than about 1 mm.

32. The process according to claim 1 wherein the support material comprises a refractory material selected from the group consisting of alumina, titania, zirconia, gallium oxide ($Ga_2O_3$), silica and mixtures thereof.

33. The process according to claim 1 wherein the oxygen containing gas comprises air, oxygen-enriched air, oxygen blended with a diluent gas, or substantially pure oxygen.

34. The process according to claim 1 wherein the hydrocarbon containing gas comprises natural gas.

35. The process according to claim 1 wherein the partial oxidation catalyst exhibits a hydrogen selectivity of greater than or equal to 85 mole %.

36. The process according to claim 1 wherein the partial oxidation catalyst exhibits a carbon monoxide selectivity of greater than or equal to 85 mole %.

37. The process according to claim 1 wherein the partial oxidation catalyst exhibits a methane conversion of greater than or equal to 85 mole %.

38. The process according to claim 1 wherein the gas stream comprising hydrogen and carbon monoxide is further reacted in a hydrocarbon synthesis reactor under conditions effective to produce liquid hydrocarbons.

39. A process for producing synthesis gas comprising:
passing a hydrocarbon containing gas and an oxygen containing gas over a partial oxidation catalyst, under conditions effective to produce a gas stream comprising hydrogen and carbon monoxide,
wherein the partial oxidation catalyst comprises a catalytic metal and a support material;
wherein the partial oxidation catalyst includes a plurality of discrete structures, each comprising a core containing said support material and an outer region disposed on said core;
wherein the plurality of discrete structures has an average size greater than 0.5 mm;
wherein the outer region has an thickness of not more than 200 microns,
wherein more than 60% of the catalytically active metal loaded on the discrete structure is located in the outer region, and further
wherein the core is nonmicroporous.

40. The process according to claim 39 wherein the nonmicroporous core is created before the loading of the catalytically active metal by applying a pore blocking material to the support material and then calcining, said pore blocking material being selected from the group consisting of silicic acid and sodium carbonate.

* * * * *